H. W. DOVER.
HAND WHEEL.
APPLICATION FILED SEPT. 30, 1920.
1,388,806.
Patented Aug. 23, 1921.
2 SHEETS—SHEET 1.
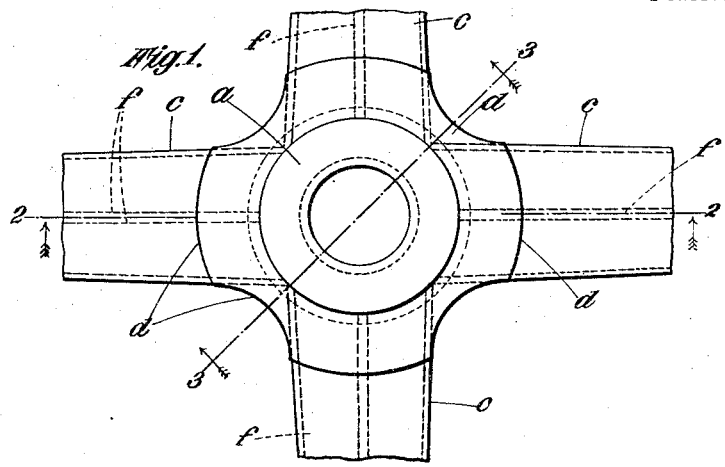
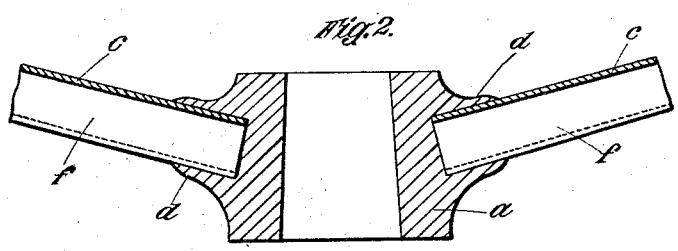
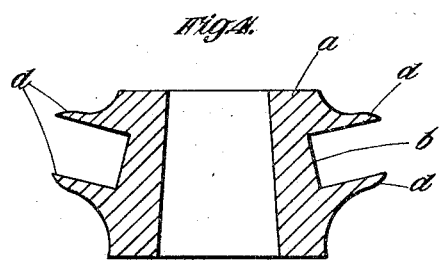
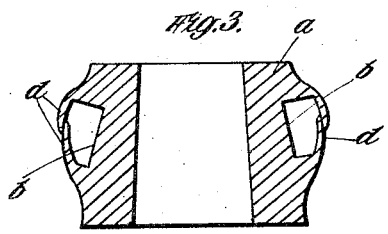
INVENTOR
HORACE W. DOVER
BY
ATTORNEYS H. W. DOVER.
HAND WHEEL.
APPLICATION FILED SEPT. 30, 1920.
1,388,806.
Patented Aug. 23, 1921.
2 SHEETS-SHEET 2.
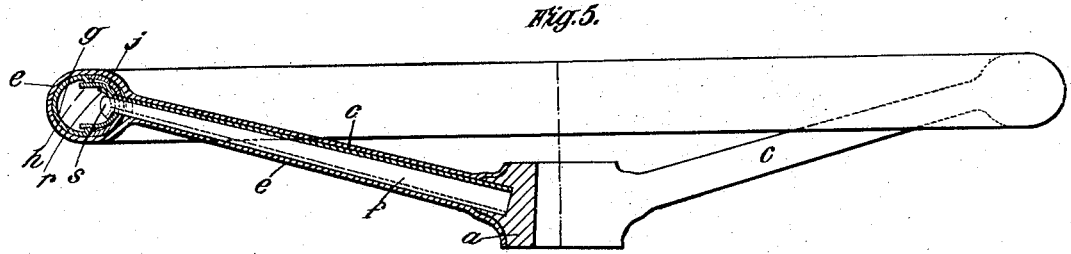
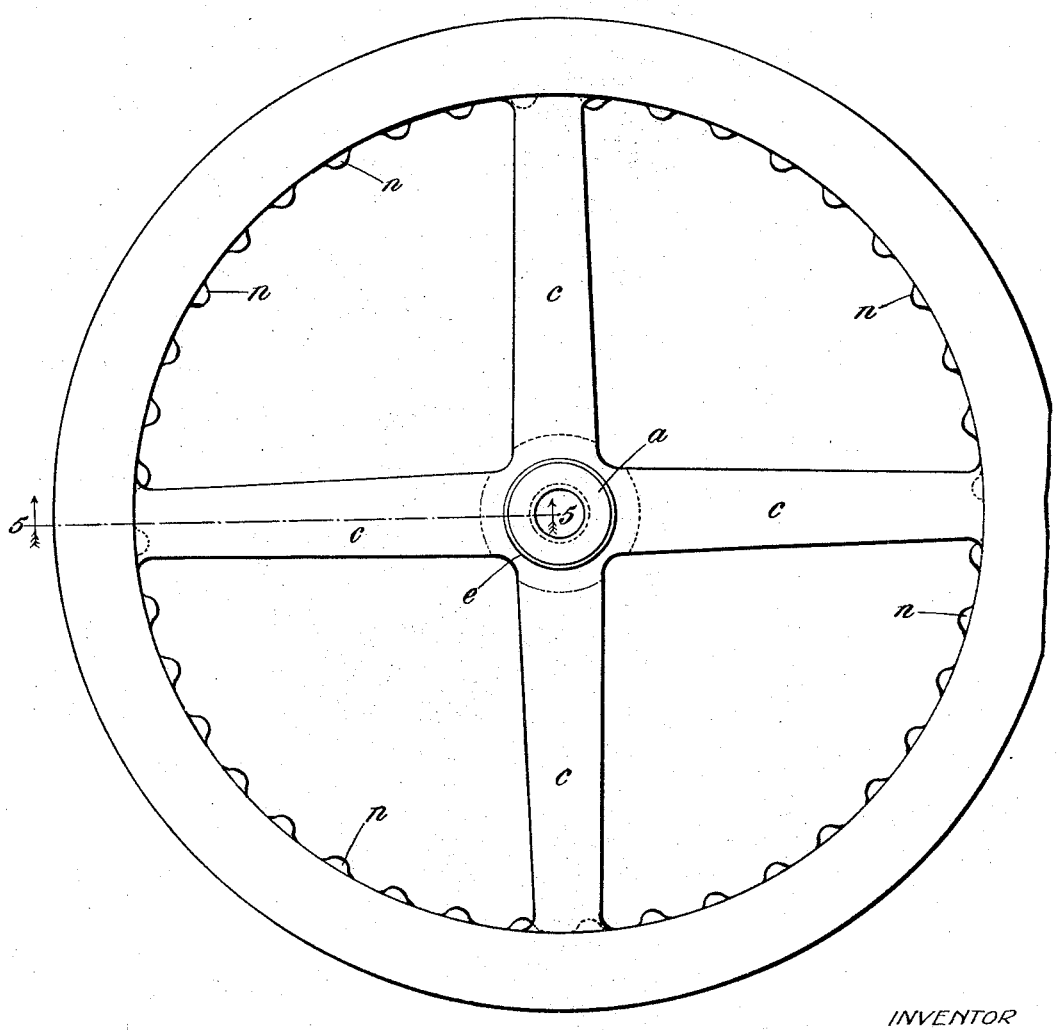
INVENTOR
HORACE W. DOVER
BY
ATTORNEYS

UNITED STATES PATENT OFFICE.

HORACE WALTER DOVER, OF ST. JAMES, ENGLAND.

HAND-WHEEL.

1,388,806.  Specification of Letters Patent.  Patented Aug. 23, 1921.

Application filed September 30, 1920. Serial No. 413,850.

*To all whom it may concern:*

Be it known that I, HORACE WALTER DOVER, a British subject, of Holywood, St. James, Northampton, England, engineer, have invented certain new and useful Improvements in or Relating to Hand-Wheels, of which the following is a specification.

This invention relates to hand wheels such for instance as are employed for steering motor vehicles, for operating stop cocks, controlling aircraft, motor boats, gun mechanism, and for other purposes, and has for its object to obviate or reduce the use of cast parts and to cheapen the cost of construction.

According to this invention the hub of such a hand wheel is formed peripherally with a groove adapted to receive the inner ends of the arms or spokes of the wheel, said groove being bounded on two of its sides by flanges adapted to be pressed toward one another so as to fit closely around said arms.

The arms may be solid or tubular and produced by casting, stamping, drawing or other method,—for instance each arm may be formed by suitably bending a stamped sheet metal blank, whereof those edges which, when the blank is bent to the required form, are contiguous, are provided with undercut tongues adapted to be interlaced or dovetailed together. Preferably, however, each arm is formed according to the invention set forth in the specification accompanying my application for Letters Patent Serial No. 413,851, *i. e.*, each arm is formed from sheet metal bent from a blank to the desired cross-section of arm required, the lateral marginal portions of the blank being inturned at what is to be, preferably, the underside of the arm, so as to form a diaphragm across, or strengthening rib within, the arm.

The accompanying drawings illustrate one form of the invention, Figure 1 being a plan of the hub of a wheel showing portions of the arms, Figs. 2 and 3 sections on the lines 2—2, and 3—3, Fig. 1 respectively, Fig. 4 a similar view to Fig. 2 but showing the hub as turned, Fig. 5 a sectional side view of a wheel on a smaller scale and Fig. 6 a plan thereof, those parts of Fig. 5 which are to the right of the center line being shown in elevation and those parts to the left of said line being shown in section on the line 5—5, Fig. 6.

As shown in Fig. 4 the hub $a$ of a hand wheel is turned from a bar of metal and is formed with a peripheral groove $b$ whereof the depth in the direction of the axis of the hub $a$ is substantially equal to the thickness of the arms $c$ . . . with which the wheel is to be provided, while its radial depth is sufficient to enable the inner ends of the arms $c$ . . . to be well supported therein, as shown in Fig. 2. At its upper and lower sides the groove $b$ is bounded, for the greater part of its radial depth, by flanges $d, d$ whereof the thickness in the direction of the axis of the hub $a$ decreases as the radial dimension increases and the groove $b$ is cut with its radial depth inclined to the axis of the hub $a$, so that when the inner ends of the arms $c$ . . . are placed therein, said arms are upwardly inclined as shown in Fig. 2 and the median plane of the rim-portion (not shown) is higher than that of the hub-portion $a$.

The desired number of arms $c$ . . . is placed in position in the groove $b$ and pressure is then applied to the two flanges $d, d$ so as to press them together and cause them to fit closely around the inner ends of the arms $c$ . . . as shown in Figs. 1 and 3. For this purpose suitably shaped dies are employed so that the edges of said flanges are caused to overlap between the arms $c$ . . . as shown in Fig. 3 after which the parts may be rendered more secure by brazing, welding or the like.

Each arm $c$ may be bent from a stamped sheet metal blank formed, at what is to be the inner end of the arm, with a pair of segmental notches so disposed that when the blank is bent substantially along its central longitudinal line, said notches come opposite one another and said inner end is curved to conform with the circumference at the bottom of the groove in the hub portion. The two longitudinal marginal portions of the blank, which is preferably tapered toward what is to be the outer end of the arm, are stamped so as to present staggered undercut tongues, which, when the blank is bent as above mentioned, can be caused to interlace or dovetail together, thus strengthening the arm. The blank is also stamped, at what is to be the outer end of the arm, with a pair of tongues, which, after the blank has been bent to the desired form, lie opposite one another and after being passed through corresponding apertures in a washer may be passed through corresponding apertures in one of the channeled members, from two of which, and a stiffening bank, the rim-portion may be built up in accordance with my prior British Letters Patent No. 2623 of 1906 and then through corresponding apertures in another washer disposed within said channeled member, after which said tongues are bent apart so as to lie flat against the last mentioned washer. If desired the tongues and washer may be brazed, welded or otherwise united together and to the channeled member. The remainder of the rim-portion may be then built up in accordance with the above-mentioned British Letters Patent No. 2623 of 1906 and the whole with the exception of the end faces of the hub-portion $a$ and its axial bore may be incased in a casing $e$ of celluloid, exonite, or similar material, or of a non-inflammable material capable of being molded in a similar manner, applied according to any of the well known methods of manufacture (e. g., molding).

Preferably, however, each arm $c$ is formed according to the invention set forth in the specification accompanying my application for Letters Patent Serial No. 413,851 aforesaid, and is of substantially flattened oval cross-section, the underside being V-shaped, while the lateral marginal portions $f, f$ of the blank from which the arm $c$ is bent up are sharply inturned so as to lie contiguous with one another and constitute a diaphragm or strengthening rib lying substantially along the minor axis of the cross-section. Preferably, also, as shown in Fig. 5, the rim-portion is built up, in accordance with the invention set forth in the specification accompanying my application for Letters Patent Serial No. 413,854 of an annular outer peripheral portion $g$ of concavo-convex cross-section and an annular inner peripheral portion constituted by two parts $h, j$, each of concavo-convex cross-section, arranged the one, $h$, within the other, $j$, the ends of the arms $c$ . . . being passed through said parts and bent over as at $r, s$ and secured as set forth in the specification accompanying my application for Letters Patent Serial No. 413,851 aforesaid.

If desired the rim-portion and the arms may be wrapped spirally with a tape of linen or other fabric after which the covering compound or material may be applied as above mentioned.

The inner peripheral portion of the rim-portion of the wheel may be formed with a plurality of ribs $n$ . . . to facilitate the gripping of the wheel by the user.

In some cases cast or stamped solid or drawn tubular arms may be employed for the wheel, but the use of arms formed from stamped blanks as above set forth obviates the employment of any cast elements in the construction.

Having now particularly described and ascertained the nature of my said invention and in such manner the same is to be performed, I declare that what I claim is:—

1. A hub for a hand wheel, formed peripherally with a groove adapted to receive the inner ends of the arms or spokes of the wheel said groove being bounded on two of its sides by flanges adapted to be pressed toward one another so as to fit closely around said arms.

2. A hub for a hand wheel as claimed in claim 1, wherein the thickness of the flanges in the direction of the axis of the hub decreases as the radial dimension increases, substantially as set forth.

HORACE WALTER DOVER.